Sept. 12, 1950   J. C. GILL   2,521,907
MECHANICAL DEVICE FOR SEPARATING
EGG WHITES FROM YOLKS
Filed Sept. 25, 1947   3 Sheets-Sheet 1

INVENTOR.
JAMES C. GILL,
BY: Harold B. Hood
ATTORNEY.

Sept. 12, 1950 J. C. GILL 2,521,907
MECHANICAL DEVICE FOR SEPARATING
EGG WHITES FROM YOLKS
Filed Sept. 25, 1947 3 Sheets-Sheet 2

INVENTOR.
JAMES C. GILL,
BY: Harold B. Hood.
ATTORNEY.

Sept. 12, 1950 J. C. GILL 2,521,907
MECHANICAL DEVICE FOR SEPARATING
EGG WHITES FROM YOLKS
Filed Sept. 25, 1947 3 Sheets-Sheet 3

INVENTOR.
JAMES C. GILL,
BY: *Harold B. Hood*
ATTORNEY.

Patented Sept. 12, 1950

2,521,907

UNITED STATES PATENT OFFICE 2,521,907

MECHANICAL DEVICE FOR SEPARATING EGG WHITES FROM YOLKS

James C. Gill, Indianapolis, Ind.

Application September 25, 1947, Serial No. 776,129

11 Claims. (Cl. 146—2)

In commercial establishments in which large quantities of eggs are handled, processed, treated, or used, egg breaking machines are more or less common. Such machines, exemplified for instance in the patent to Sigler 2,229,349, break the shells of eggs and drop the meats thereof, including both the yolk and the white. For many purposes, it is desirable to separate the yolk from the white, and to lead all yolks to one receiver and all whites to another. Mechanical devices of one sort or another have been provided for accomplishing this separation; but all such devices, so far as I am advised, have necessarily embodied certain defects which have resulted in unsatisfactory operation, when efforts were made to make those devices fully automatic. As a consequence, all automatic machines for separating egg yolks from egg whites, so far as I am advised, have been unsatisfactory in that they break many yolks, and do not accomplish a satisfactory and effective separation of the whites from the yolks, leaving portions of the egg whites in contact with many yolks at the time when the yolks are deposited in the yolk receiver.

The primary object of the present invention is to provide a fully automatic separating machine, particularly adapted for use with egg breaking machines, and embodying several entirely novel features of construction and operation whereby the functional defects and disadvantages of previously known separating mechanisms are completely overcome. A further object of the invention is to provide a mechanism in which a two-part receiver is provided to receive the entire meat of an egg, such receiver comprising a base section or yolk cup for holding the yolk and a rim section surrounding and projecting above and beyond the base section, together with means for moving the entire receiver past a breaking station, thence past a separating station, wherein the base section is moved upwardly relative to the rim section to establish an annular discharge opening surrounding the base section, from which the egg white may be discharged to a receiver, and wherein the base section is then caused to drop sharply into its original position, relative to the rim section, to cause residual egg white remaining in the base section to be slopped over the edge of the base section, and to cut off egg white which may be hanging over the edge of the base section. At this separating station, preferably, the base section will be repeatedly actuated in the above-described fashion. From the separating station, the entire receiver moves to a further station in which it is inverted, to discharge the yolk into a yolk receiver; and thence the receiver moves through a cleaning station, and returns to operative association with the egg breaker.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
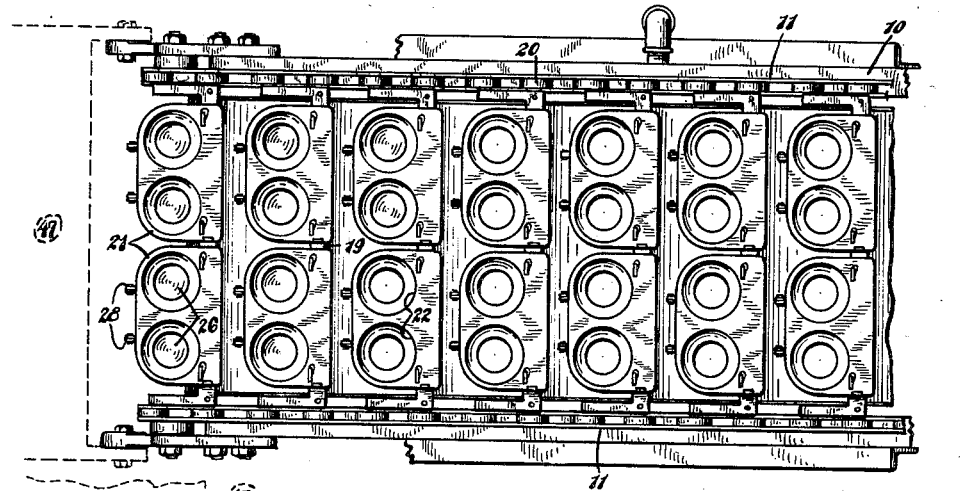
Fig. 1 is a plan view of the receiving end of a separating mechanism constructed in accordance with the present invention.

Referring more particularly to the drawings, it will be seen that I have illustrated a frame 10 providing runways for a pair of endless members 11, 11 running over sprockets 12, 12 at one end of the machine and sprockets 13, 13 at the other end of the machine. Drive sprockets 14, 14, mounted on a shaft 15 carrying the external power-input sprocket 16, engage the elements 11, 11 and, with the idler sprockets 18, 18, define the paths of the elements 11.

A plurality of pairs of carriages 19 are operatively engaged with the elements 11, 11 and carry rollers 20 guided to move upon suitable trackways provided by the machine frame.

Each carriage 19 supports a tray 21 formed to provide a pair of depressions 22 having rims comprising converging walls 23 which terminate, at their lower ends, in inturned annular flanges 24, each flange defining a base opening 25 for its depression 22. In the illustrated embodiment of the invention, the openings 25 are truly circular in contour, and a base section or yolk cup 26 is associated with each depression 22 to close the opening 25 thereof. In the illustrated embodiment of the invention, the cup 26 is circular in horizontal section, and flares upwardly to its mouth or edge 27. The diameter of the cup edge 27 is somewhat larger than the diameter of the opening 25 with which it is associated, and each cup will preferably be ground to a substantially liquid tight fit with the associated flange 24. Thus I provide a plurality of egg receivers, each comprising a rim 23 and a cooperating yolk cup 26.

A bracket 28 upon the tray 21 provides a mounting for a pivot pin 29 upon which is hinged a lever or arm 30 having a laterally projecting flange or platform 31 formed with a perforation 32 therethrough. The perforation 32 receives a stud 33 on a block 34, providing a mounting for said block upon which the block may rotate about the axis of the stud 33. The block 34 is cupped in its upper surface to receive a yolk cup 26 which is rigidly secured thereto by means of a rivet 35 passing through said cup, through said block 34 and stud 33, and through a washer 36 engaging the base of the stud 33. At its outer end, each arm 30 carries a stud 37 upon which is mounted a roller 38.

Figure 4:
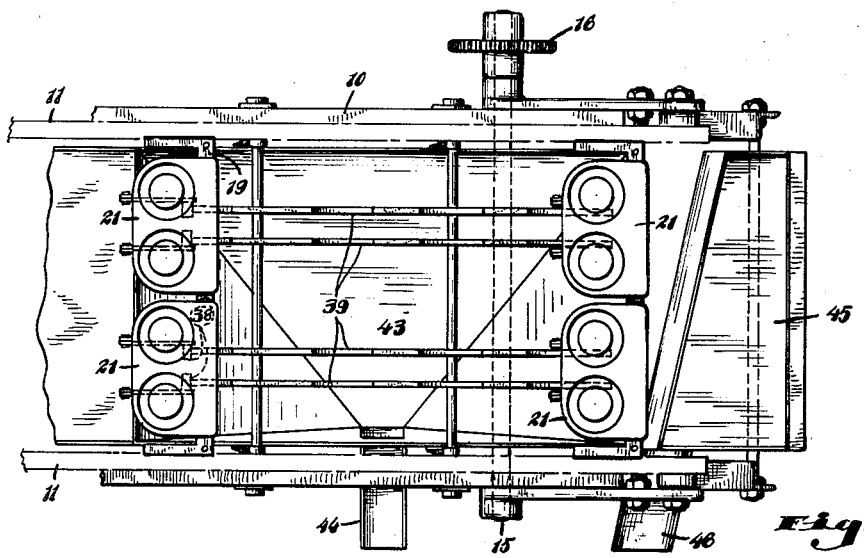
Fig. 4 is a plan view of the discharge end of the machine.
Figure 5:
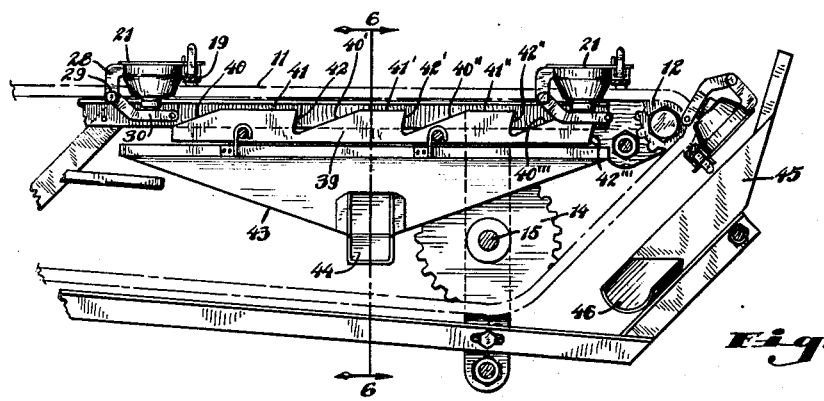
Fig. 5 is a longitudinal section thereof.
Figure 6:
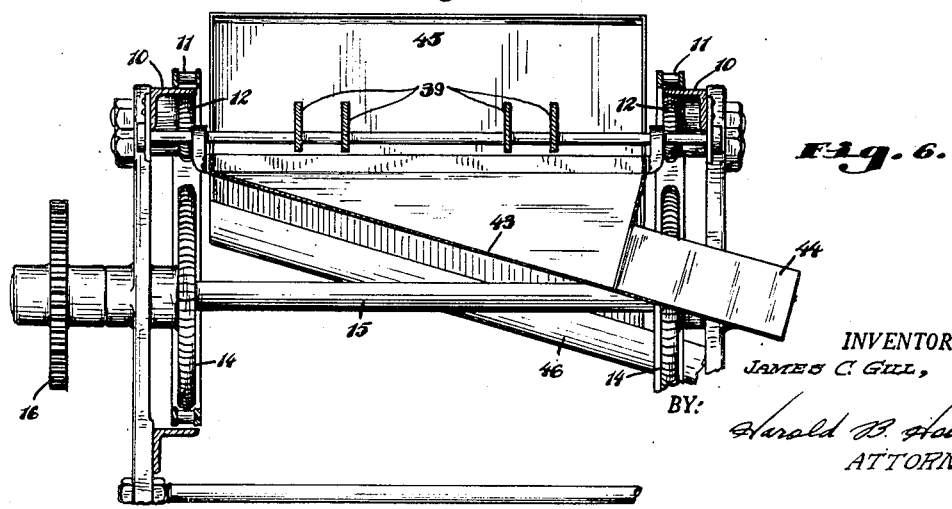
Fig. 6 is a transverse section taken substantially on the line 6—6 of Fig. 5.
Figure 7:
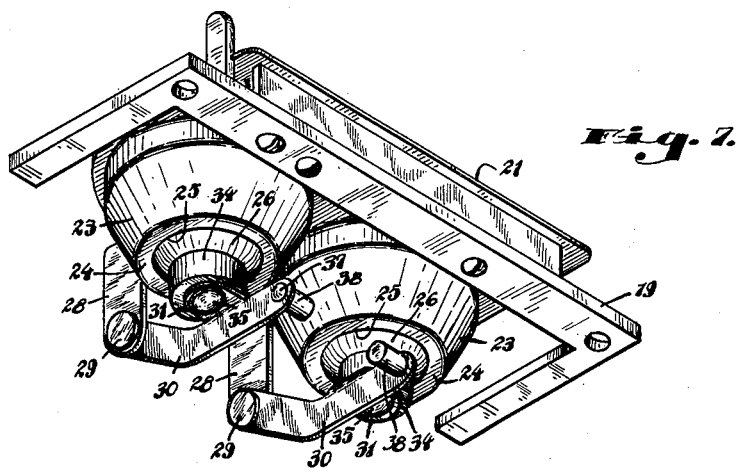
Fig. 7 is a bottom perspective view of a carriage used in the machine, drawn to an enlarged scale.
Figure 8:
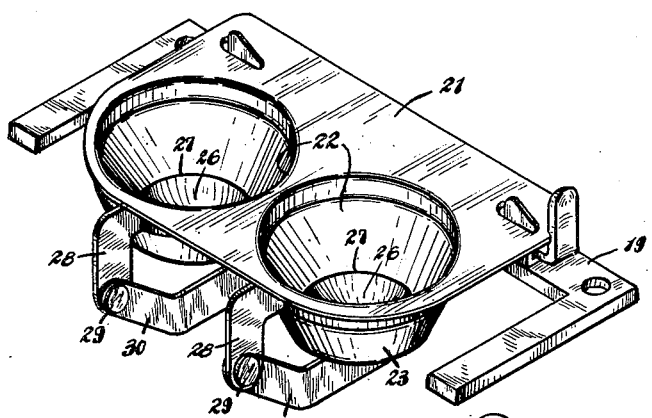
Fig. 8 is a top perspective view thereof.
Figure 9:
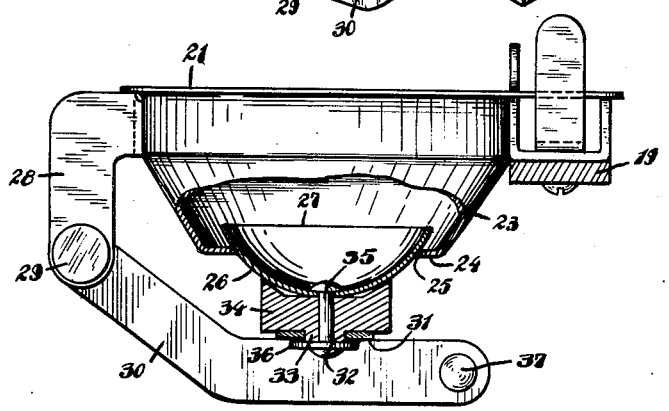
Fig. 9 is a side elevation of an egg receiver, still further enlarged, parts being broken away or shown in section for clarity of illustration.

In a region near the discharge end of the machine, I mount a plurality of cam plates or lifting means 39 for the yolk cups 26 (see Figs. 4, 5, and 6). Each cam plate is disposed in the path of one roller 38, and each is formed to provide an upwardly inclined surface 40, traversing the plane of the normal movement of an associated roller 38, a substantially horizontal surface 41, parallel with such plane, and a sharply declivitous portion 42. As each carriage 19 moves into association with the cam plate 39, its rollers 38 will engage the surfaces 40, and will be moved upwardly about the pivots 29, thereby lifting the yolk cups 26. As the rollers follow the surfaces 41, the cups will be held in elevated positions; and as the rollers pass the ends of the surfaces 41, they will drop sharply, whereby each cup will fall precipitately into the position illustrated in Fig. 9.

I prefer to form each cam plate 39 with surfaces 40', 41', 42', 40'', 41'', 42'', 40''' and 42''', whereby each yolk cup will be raised, carried in raised position, and then sharply dropped, several times during its passage through the separating station.

A hopper 43 is positioned beneath the cam plates 39 to receive egg whites discharged from the carriages during their passage of the cam plates, and a chute 44 will preferably discharge egg whites, from said hopper to any suitable receiver (not shown) associated therewith. As the carriages depart from the cam plates, they are carried around the sprockets 12 and are thereby inverted over a hopper 45 positioned to receive yolks discharged from said carriages. A chute 46 carries yolks from the hopper 45 to any suitable receiver (not shown) associated therewith.

Figure 2:
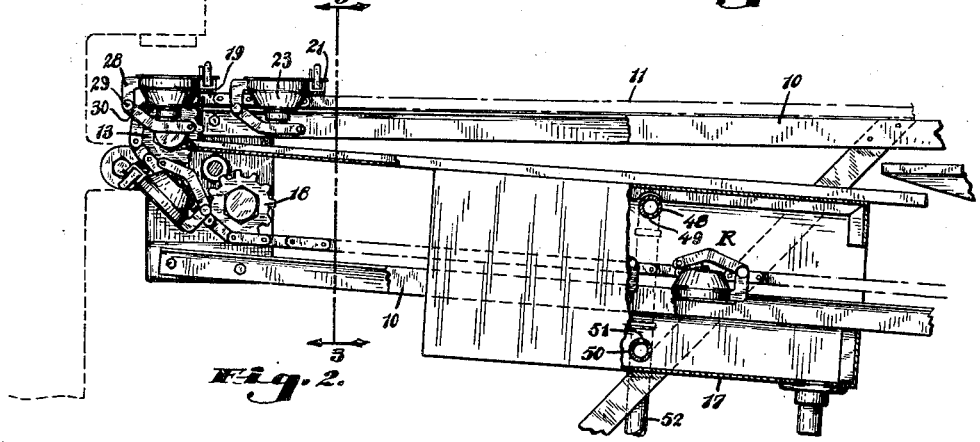
Fig. 2 is a longitudinal section of the portion of the machine illustrated in Fig. 1.
Figure 3:
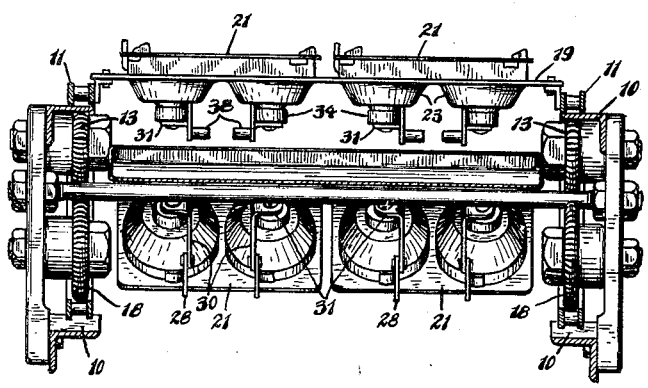
Fig. 3 is a transverse section taken substantially on the line 3—3 of Fig. 2.

As the carriages 19 progress along the return run of the elements 11, gravity will hold the cups in the position illustrated at R in Fig. 2; and the carriages travel through a cleaning box 17, within which are provided two headers 48 and 50 from which steam is discharged downwardly, through ports 49, and upwardly, through ports 51, to contact and clean all surfaces of each cup.

The cleaned carriages pass around the sprockets 18 and 13 into cooperative association with an egg breaking machine indicated diagrammatically at 47. The machine 47 will deposit the yolk and white of an egg in each depression 22. The cups 26 are so proportioned and designed as to receive and retain an egg yolk, with the yolk substantially completely filling the cup, and bulging above its edge 27. The egg white, therefore, will almost entirely be deposited in the rim section 23, though a certain amount of the white will usually find a place within the cup 26.

Now, as the roller 38 strikes the cam surface 40, the cup 26 will be lifted relative to the depression walls 23 and the flange 24, to establish an annular passage around the cup 26 through which the egg white in the depression 22 may escape. Most of the white will be discharged through such opening as the rollers follow the cam surface 41; but the viscous character of egg whites sometimes results in strings of white being suspended from portions of the egg white retained in the cup 26, hanging over the edge 27 of the cup, and being carried along with the tray. When the roller 38 moves off the surface 41, and the cup walls drop sharply into engagement with the flange 24, such strings of egg white will be sheared off, and the portion below the opening 25 will drop into the hopper 43. At the same time, the jar with which the cup strikes the flange 24 will frequently cause residual egg white to be jostled or slopped out of the cup 26 and into the depression 22, whence it will be discharged the next time the cup is raised by engagement of the roller with the cam surface 40'. I find that the repeated elevation and jarring of the cup 26 produced by the particular cam mechanism illustrated results in a very effective separation of substantially all of the white of every egg from its yolk.

As the carriage rounds the sprocket 12, it is inverted in the manner clearly illustrated in Fig. 5, and the yolk is discharged from the cup to the hopper 45.

In egg separating mechanisms previously known to me, it has invariably been customary to mount the rim section for movement relative to the cup section, or base section, instead of mounting the base section for movement relative to the rim section, in the manner disclosed in the present application. As a result, it has been necessary to cause the periphery of the opening through the rim section to engage the upper surface of the outermost edge of the base section. Not only is it difficult to provide a fluid-tight fit between the sections, under those circumstances, but when the sections come together, at such a joint, it is impossible to produce a shearing action upon egg whites overlying the edge of the base section. The only action which can be produced is a pinching or crushing action; and it has been found that such action does not effectively shear egg white overhanging the lip of the cup section. According to the present invention, a true shearing action takes place, and the egg white is invariably severed in the manner intended.

I claim as my invention:

1. An egg-separating mechanism comprising a receiver including a yolk cup and a rim, said rim having a bottom opening and said yolk cup projecting through said opening whereby the upwardly-opening mouth of said yolk cup is located always within said rim, the diameter of said yolk cup mouth exceeding that of said opening, and means cooperable with said receiver for producing separating relative movement between said yolk cup and said rim and subsequently reversing such movement to bring said yolk cup and said rim sharply together.

2. An egg-separating mechanism comprising a receiver including an upwardly-flaring yolk cup and a rim section, said rim section having an opening in its bottom, the dimensions of said opening being less than the dimensions of the mouth of said yolk cup and said yolk cup projecting through said opening with its perimeter, at an elevation below said mouth, in sealing engagement with the boundary of said opening, and means acting to lift said yolk cup relative to said rim section to provide a passage through said opening around said yolk cup.

3. The mechanism of claim 2 in which said lifting means, after lifting the yolk cup, acts to drop the same sharply into engagement with the wall of said rim section defining the boundary of said opening.

4. In a machine of the class described, a tray having a depression therein with downwardly-converging walls defining a downwardly-directed opening, and a cup having upwardly flaring walls and an upwardly-presented mouth larger than said opening, said cup being received and supported upon the inside lowermost edges of said converging walls to close the opening therein, said cup being free for movement upwardly relative to the base of said depression to open a passage around said cup for escape of fluid from said depression.

5. The machine of claim 4 including means associated with said tray and providing a hinge support for said cup upon an axis outside said depression.

6. In a machine of the class described, a continuous element, means for driving said element about a closed path, a plurality of trays supported upon said element for movement therewith, each tray having a depression therein with downwardly-converging walls defining a downwardly-directed opening, and a cup having upwardly flaring walls and an upwardly-presented mouth, larger than said opening, said cup being received and supported upon the inside lowermost edges of said converging walls to close the opening therein, said cup being free for movement upwardly relative to the base of said depression, and cam means positioned adjacent the path of said trays and cooperable therewith, successively, to lift each cup relative to the base of its associated depression to open a passage around said cup for escape of fluid from said depression.

7. In a machine of the class described, a continuous element, means for driving said element about a closed path, a plurality of trays supported upon said element for movement therewith, each tray having a depression therein with downwardly-converging walls defining a downwardly-directed opening, and a cup having upwardly flaring walls and an upwardly-presented mouth larger than said opening, said cup being received and supported upon the inside lowermost edges of said converging walls to close the opening therein, said cup being free to move upwardly relative to said wall edges, and cam means positioned adjacent the path of said trays and cooperable therewith, successively, to lift each cup relative to the base of its associated depression to open a passage around said cup for escape of fluid from said depression, and then to drop said cup sharply into engagement with said wall edges.

8. The machine of claim 6 in which each cup is hingedly mounted upon its associated tray to swing about a substantially horizontal axis outside its associated depression.

9. The machine of claim 6 in which each cup is supported upon an arm hingedly mounted for movement about a substantially horizontal axis outside the associated depression, and in which said cam means is mounted in the path of said arm.

10. In a machine of the class described, a continuous element, means for driving said element about a closed path, a plurality of trays supported upon said element for movement therewith, each tray having a depression therein with downwardly-converging walls defining a downwardly-directed opening, and a cup having upwardly flaring walls and an upwardly-presented mouth larger than said opening, said cup being received and supported upon the inside lowermost edges of said converging walls to close the opening therein, said cup being free for movement upwardly relative to the base of said depression, and being supported upon an arm hingedly mounted for movement about a substantially horizontal axis outside the associated depression, and cam means mounted in the path followed by said arms and comprising a surface gradually inclining, in the direction of travel of said trays, out of parallelism with the plane of travel of said trays, then a surface substantially parallel with said plane, and then a surface substantially perpendicular to said plane.

11. The machine of claim 9 in which said cam means comprises further another similarly-inclined surface, another substantially parallel surface, and another substantially perpendicular surface immediately following said first-named series of surfaces.

JAMES C. GILL.

REFERENCES CITED

The following references are of record in the file of this patent:

UNITED STATES PATENTS

| Number | Name | Date |
|---|---|---|
| 1,747,432 | Eskholme | Feb. 18, 1930 |
| 1,988,030 | Young et al. | Jan. 15, 1935 |
| 2,018,162 | Weldon | Oct. 22, 1935 |
| 2,090,963 | Reese | Aug. 24, 1937 |
| 2,187,488 | Brueggeman | Jan. 16, 1940 |